United States Patent Office 3,355,859
Patented Dec. 5, 1967

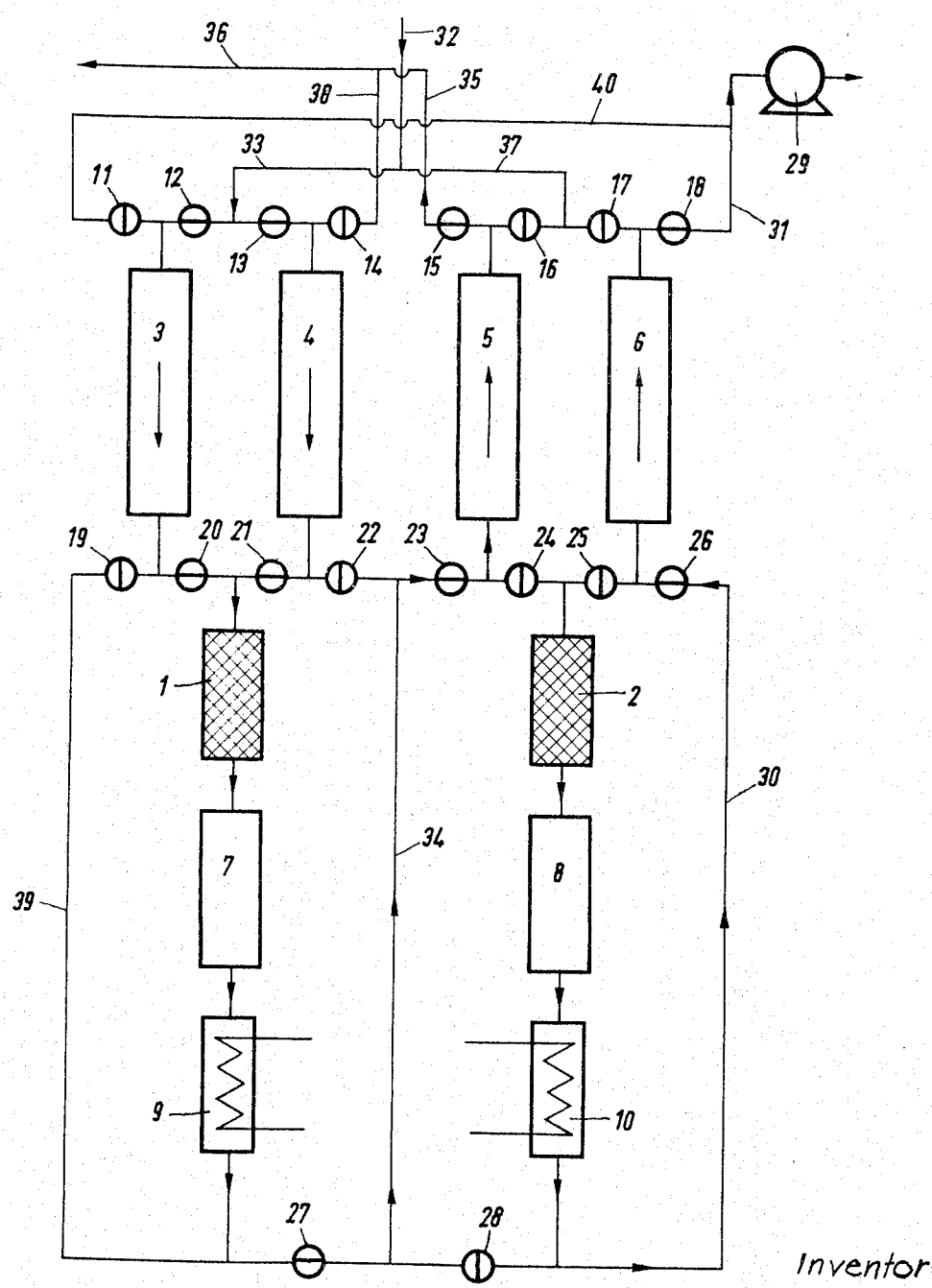

3,355,859
SELECTIVE ADSORPTION OF GASES AT LOW TEMPERATURE
Ernst Karwat, Pullach, Isartal, Germany, assignor to Lind Aktiengesellschaft, a corporation of Germany
Filed Feb. 13, 1964, Ser. No. 344,785
Claims priority, application Germany, Feb. 15, 1963, G 37,076; Jan. 17, 1964, G 39,640 (addition)
6 Claims. (Cl. 55—25)

This invention relates to an adsorption process and an apparatus for the enrichment of one component of a gaseous mixture.

It is known that with adsorbents such as silica gel, or with the so-called molecular sieves such as zeolite, it is possible to separate various gaseous components from gaseous mixtures. This separation depends on a number of factors including the kind of adsorbent, the gaseous components of the mixture, and the temperature at which the adsorption occurs.

It is also known that the adsorbents and molecular sieves can adsorb the oxygen and nitrogen of the air. At very low temperatures, e.g. 90° K., the oxygen of the air is preferentially adsorbed, but with increasing temperatures, this preference continually decreases, and eventually is inverted when at room temperature nitrogen is adsorbed from the air more readily than oxygen. The partitioning of nitrogen and oxygen by the gel is thus not only proportional to the partial pressures of these gases in the air, but is also a function of the temperature.

It has been suggested to use this effect for obtaining oxygen rich air by passing the air at temperatures between +40° C. and —30° C. over zeolite whereby nitrogen is selectively retained, resulting in an oxygen-rich air stream leaving the zeolite layer. For this purpose, however, the air must be thoroughly dried, down to only a few p.p.m. $H_2O$, at a pressure of 1 atm. e.g. 20 p.p.m. For such a complete removal of $H_2O$ at room temperature, there is no economically practical technique, and that is why this method of obtaining oxygen from air is not economically feasible. Conversely, if the $H_2O$ is not removed from the air to the extent necessary, the adsorbent is blocked by the water which is preferably adsorbed.

The principal object of this invention therefore is to provide a method and apparatus for enriching the components of gaseous mixtures, and to make this method simpler and more economical than the known process.

Other objects are to obtain an oxygen-enriched stream from air, and a hydrogen-enriched stream from a mixture of hydrogen and ethylene.

Upon further study of the specification and claims other objects and advantages of the present invention will become apparent.

To attain the objects of this invention, the feed gas is dehydrated until the water vapor therein amounts to less than about $(20/p)$ mg./Nm.$^3$ (where $p$ is the total absolute pressure of the gaseous mixture in kg./cm.$^2$), and then the resultant dried gas is passed over an adsorption agent which adsorbs a certain component A in preference to another component B.

By this procedure it is mainly the A component that is adsorbed while the gas that leaves the adsorber will be richer in B than the original mixture. After a certain time the adsorbent will become saturated with A, and then the exit gases will have the same composition as the initial mixture. At this time or earlier, the passage of the gaseous mixture over the adsorbent is interrupted, and the A-rich mixture that has been collected by the adsorbent is removed by heat or vacuum. The adsorbent which has been treated in this manner will then be ready for further use.

Suitable adsorbents are oxides and hydrated oxides, such as silica gel and alumina gel, artificial zeolites, and activated carbon black.

By the method of this invention the requirements for the best drying are combined in a technically advantageous and economical manner with the requirements for adequate fractionation.

The figure is a schematic flowsheet illustrating a preferred embodiment of this invention.

According to a particularly preferred embodiment of this invention the required degree of dryness of the gas is achieved by passing the gas over cold regenerator masses to cool and dry the gas to a water content of less than $(20/p)$ mg./Nm.$^3$ before passing it through the adsorber. This dried gas is then passed over the adsorption material at about the same temperature.

In order to bring the water content in the gaseous mixture down to $(20/p)$ mg. $H_2O/Nm.^3$, the temperature at 2 atmospheres pressure must be below —58° C., while at 1 atm. it must be below —53° C. For the adsorption process a temperature of —60° C. is therefore chosen. The water that has precipitated onto the regenerator mass is preferably removed by passing the fractionated products separately through the mass at a sufficiently low pressure to sublime the water.

For oxygen enrichment of air, it is necessary to take into consideration that the selectivity of the adsorption material for nitrogen at lower temperatures is lower than at room temperatures, while the amount of gas adsorbed thereby is much greater than at room temperature. A satisfactory oxygen enrichment is achieved if in this case an adsorption temperature between —100° C. and —60° C. and preferably about —70° C. is chosen.

The oxygen enrichment depends not only on the temperature, but also on the pressure during adsorption ($P_A$) and on the ratio of the pressure during adsorption ($P_A$) to the back pressure of the materials that are present on the regenerated adsorption material, i.e. the desorption pressure ($P_D$). With an adsorption pressure of 2 atm. absolute or less, and a $P_D$ to $P_A$ ratio of 1:2 to 1:20, the oxygen enrichment will be about proportional to the ratio of the pressures. With the ratio of $P_D$ to $P_A$ remaining constant, the use of adsorption pressures higher than 2 atm. absolute will produce smaller yields of oxygen, as will also result from a further reduction of the pressure ratio. Consequently, for the oxygen enrichment of air, the preferred maximum adsorption pressure is 2 atm. and relation of desorption pressure to adsorption pressure is between 1:2 to 1:20.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

Enrichment of oxygen in the air (component A is nitrogen and component B is oxygen).—Referring to the drawing, two transposable adsorbers 1 and 2 are filled with tabout 5000 kg. "Linde molecular sieve Type 5A," a type of zeolite. Before and after the adsorbers, regenerators or cold accumulators 3–8 and coolers 9 and 10 are connected as shown. The system is operated in two phases. In the first phase, as shown on the drawing, valves 11, 14, 16, 17, 19, 22, 24, 25 and 28 are closed, while valves 12, 13, 15, 18, 20, 21, 23, 26 and 27 are opened. With this setting of the valves, the adsorber 2 is evacuated by the pump 29 for several minutes, depending of course on the size of the pump, to reach a final pressure of 40 Torr (mm. Hg). The $N_2$ rich mixture in the adsorber is thereby withdrawn over the cold accumulator 8, cooler 10, conduit 30, valve 26, cold accumulator 6, valve 18 and conduit 31 leading to pump 29. During this time 450 Nm.$^3$ air under 1.1 atm. absolute pressure flows through conduits 32 and 33, valve 12 and 13 and cold accumulators 3 and 4 in which it is cooled to $-70°$ C., from where it passes through valves 20 and 21 to adsorber 1. A N$_2$ rich mixture is retained by the adsorber whose contents are warmed a few degrees by this process, while 200 Nm$^3$ of the remaining mixture which contains about 28% oxygen passes from the adsorber 1 through cold accumulator 7, cooler 9, valve 27, conduit 34, valve 23, cold accumulator 5, valve 15 and conduit 35 for removal through conduit 36.

During the second phase of the process, valves 11, 14, 16, 17, 19, 22, 24, 25 and 28 are opened, while valves 12, 13, 15, 18, 20, 21, 23, 26 and 27 are closed. The air to be fractionated enters through conduits 32 and 37 and valves 16 and 17 and then passes through cold accumulators 5 and 6 and through valves 24 and 25 to adsorber 2 from which a gaseous mixture containing 28% oxygen is delivered to the cold accumulator 8 and which then passes through cooler 10, valve 28, conduit 34, valve 22, cold accumulator 4, valve 14, conduit 38 and delivery conduit 36. At the same time 250 Nm.$^3$ rich mixture are pumped from adsorber 1, through cold accumulator 7, coiler 9, conduit 39, valve 19, cold accumulator 3, valve 11 and conduit 40 by the pump 29. The cold accumulators 7 and 8 balance the heat of adsorption and the cold of desorption. In the first phase of the process cold accumulator 7 heats up during the adsorption, while cold accumulator 8 is cooled back to its original temperature, i.e. $-70°$ C. Losses of cold are compensated by coolers 9 and 10, which are operated for instance with Freon.

*Example 2*

Enrichment of hydrogen in an ethylene containing residual gas (component A is $C_2H_4$ and B is $H_2$).—The residual gas has the following composition:

| | Percent |
|---|---|
| $H_2$ | 79.6 |
| $C_2H_4$ | 7.6 |
| $CH_4$ | 9.3 |
| $C_2H_6$ and higher paraffins | 3.1 |
| CO | 0.4 |

This mixture contains 2–3% $H_2O$, referred to the dry mixture.

The above mixture is passed through the cold accumulators under an absolute pressure of 3.5 atm. to cool it to $-63°$ C. and also to dry it down to a water content of 5.7 mg. $H_2O/Nm.^3$.

The ethylene in this gaseous mixture has a partial pressure of 0.27 atm. At that pressure the same mixture will have deposited at equilibrium 60 Nm.$^3$ $C_2H_4$ per ton of silica gel. Desorption is performed at a pressure of 40 mm Hg. At that pressure the material at equilibrium will contain 10 Nm.$^3$ $C_2H_4$ per ton of silica gel. This amount will remain permanently on the silica gel and can be removed only by regeneration at higher temperatures and/or lower pressures. A simple calculation will show that during every evacuation phase 60−10=50 Nm.$^3$ $C_2H_4$ per ton of silica gel are desorbed, while in every adsorption phase the same amount is adsorbed. On account of the simultaneous presence of other adsorbable gaseous components (resulting in mixed adsorption) and the practical impossibility of reaching equilibrium conditions, it is more nearly correct to consider the total yield from each cycle as being not 50 but about 30 Nm.$^3$ $C_2H_4$ per ton of silica gel.

With adsorbers charged with 1.2 to 1.3 tons silica gel, there was obtained during each five minute passage of 500 Nm.$^3$ of residual gas that was passed through the adsorber: CO, $CH_4$ and some $C_6H_6$ containing hydrogen 450 Nm.$^3$ while 50 Nm.$^3$ of ethylene rich gas was pumped from the adsorber during desorption.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for producing an oxygen enriched stream from air, the steps of:

cooling a stream of air to a temperature of $-60°$ C. to $-100°$ C. by contact with the surface of a regenerator thereby depositing water and reducing the water content of the air to less than $20/p$ milligrams per standard cubic meter (0° C. and 1 atmosphere) where $p$ represents the total absolute pressure of the gaseous mixture in kg./cm.$^2$; and passing the cooled dry air stream at a temperature of from $-60°$ C. to $-100°$ C. into contact with a solid adsorbent selective for nitrogen thereby selectively removing at least part of the nitrogen, and the further steps of recovering the oxygen enriched gas from the adsorber, cooling the resultant gas, and passing same through a regenerator alternating with said first-recited regenerator, said cooling of the resultant gas comprising passing same through a second regenerator and then through an externally cooled heat exchanger.

2. The process of claim 1, wherein the adsorption step is conducted at about the same temperature as the cooling step.

3. The process of claim 1, wherein the adsorption step is conducted at a pressure of not more than 2 atmospheres absolute.

4. The process of claim 3, further comprising the step of desorbing nitrogen from the adsorbent at a pressure of from ½ to 1⁄20 of the pressure of adsorption.

5. In a process for separating ethylene from a stream of hydrogen, the steps of:

cooling the stream of hydrogen to a temperature of $-60°$ C. to $-100°$ C. by contact with surfaces of a regenerator, thereby depositing water and reducing the water content of the stream to less than $20/p$ milligrams per standard cubic meter (0° C. and 1 atmosphere) where $p$ represents the total absolute pressure of the gas mixture in kg./cm.$^2$; and passing the cooled dried hydrogen stream at a temperature of $-60°$ C. to $-100°$ C. into contact with a solid adsorbent selective for ethylene, thereby selectively adsorbing ethylene, recovering a hydrogen stream substantially free of ethylene, and desorbing the adsorbent to recover an ethylene-rich gas.

6. A process as defined by claim 5 comprising the further steps of recovering the hydrogen enriched gas from the adsorber, cooling the resultant gas, and passing same through an alternate regenerator.

References Cited

UNITED STATES PATENTS

| 2,727,587 | 12/1955 | Karwat | 62—18 X |
|---|---|---|---|
| 2,882,243 | 4/1959 | Milton. | |
| 2,882,998 | 4/1959 | Grenier | 62—18 |
| 3,140,931 | 7/1964 | McRobbie | 55—25 |
| 3,204,388 | 9/1965 | Asker | 55—31 |

REUBEN FRIEDMAN, *Primary Examiner.*

C. N. HART, *Assistant Examiner.*